June 4, 1940.  D. A. BOYD  2,202,944
SEAL
Filed June 2, 1938

INVENTOR
DONALD A. BOYD.
BY
*LaRue W. Patee*
ATTORNEY

Patented June 4, 1940

2,202,944

UNITED STATES PATENT OFFICE 2,202,944

SEAL

Donald A. Boyd, Detroit, Mich.

Application June 2, 1938, Serial No. 211,320

2 Claims. (Cl. 288—3)

This invention relates to a seal and more particularly to a seal for a rotating member such as a shaft.

An object of the invention is to provide an improved seal adapted to be inserted as a unit within a housing in encompassing relation to a rotatable member.

Another object of the invention is to provide a seal having a plurality of sealing members adapted to resiliently engage a rotatable member for preventing escapement of a lubricating medium axially thereof, and to provide in such a seal means for preventing foreign matter from gaining access to the sealing members and to the interior of the housing receiving the rotatable member and seal.

Other objects and advantages of the invention will be more apparent from the following description taken in connection with the accompanying drawing, in which.

The seal is illustrated and described in connection with a housing 10 receiving a rotatable shaft 12, the housing 10 having a counterbore receiving the seal. The seal functions to retain lubricant within the housing and to prevent dust or other foreign matter from gaining access to the interior of the seal and housing.

Figure 1:
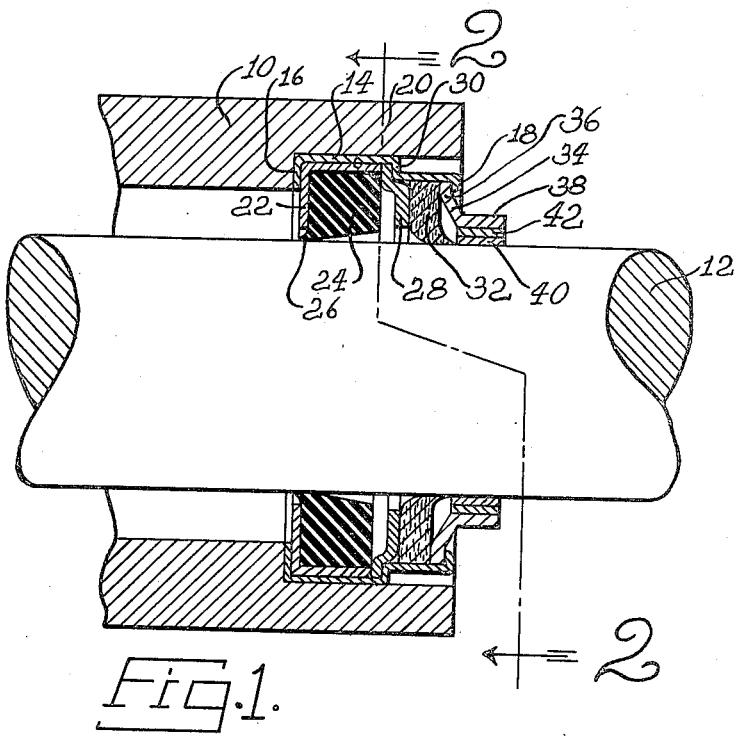
Fig. 1 is a longitudinal sectional view through a housing showing the improved seal inserted therein in encompassing relation to a shaft.
Figure 2:
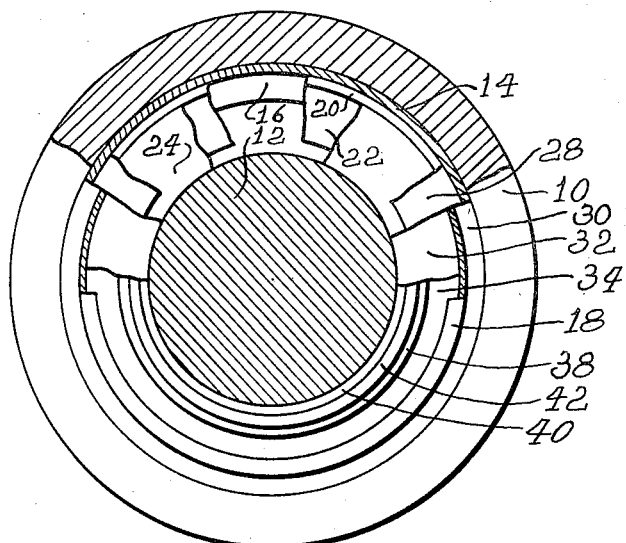
Fig. 2 is a transverse sectional view taken as indicated by the line 2—2 of Fig. 1.

The seal includes an annular metallic housing 14 having an axially extending portion provided with radially inwardly extending flanges 16 and 18 at the respective ends thereof. That portion of the housing adjacent flange 16 has a diameter greater than the diameter of the portion adjacent the flange 18 as is illustrated particularly in Fig. 1. Disposed in the portion having the larger diameter is a sealing unit comprising an annular angular, preferably metallic, member having an axially extending flange 20 abutting the inner face of the housing 14 and a radial flange 22 extending radially inwardly with respect to the shaft 12 beyond the extremity of the housing flange 16. Bonded to the angular member is an annular sealing element 24 of resilient moulded material. While the element 24 may be formed of natural rubber, it is preferably a synthetic rubber composition having the characteristics of natural rubber but which will not deteriorate in the presence of oils or greases.

The inner axially extending face of sealing element 24 is formed slightly angular with respect to the seal axis and has a portion as indicated at 26 engaging the shaft 12 to prevent lubricant escaping axially of the latter. The aforesaid sealing unit is retained against axial displacement by the flange 16 of the housing and an annular apertured ring 28 disposed between the end face of the flange 20 and a radially inwardly extending flange 30 of housing 14.

Disposed within that portion of the housing having the smaller diameter is a second sealing element 32 preferably formed of leather and being ring shaped, the inner wall thereof being tapered and when in assembled position extends axially beyond the radial plane of the main body of the sealing element to afford a greater contact area with the shaft 12.

The sealing element 32 has one face abutting the ring 28 and is retained thereagainst and against axial displacement by a ring 34, preferably of spring steel, positioned axially between the adjacent face of the sealing element 32 and the radially extending flange 18 of the housing. The ring 34 has a flange 36 extendi: ; generally radially with respect to the seal and terminating in an axially extending portion or flange 38 which preferably projects outwardly from the housing and has the inner periphery thereof radially spaced from the periphery of shaft 12. The flange 38 carries an annular member 40, preferably comprising lead, the member 40 preferably having a backing bushing 42 for securing the same to the flange 38. In the preferred form of the invention the ring 40 is suitably bonded or otherwise secured to the inner surface of the ring 42 and the latter spot welded or otherwise secured to the inner periphery of flange 38.

The inner surface of the ring 40 engages the periphery of shaft 12 and serves the dual function of preventing dust and other foreign matter from gaining access to the seal as well as preventing the escapement of lubricant axially along shaft 12.

Various changes including the size, shape and arrangement of parts may be made without departing from the spirit of the invention and it is not my intention to limit the scope thereof other than by the terms of the appended claims.

What I claim is:

1. An oil seal comprising an annular housing having an axially extending portion and integral radially extending flanges at the opposite ends thereof, a packing member of composition material and a leather packing axially spaced in said housing for encompassing relation to a centrally located shaft, an angular metallic member having a radially extending flange adjacent one of said radially extending flanges of said housing and an axially extending flange projecting outwardly from said housing, and an annular metallic member secured to the inner periphery of said axially extending flange.

2. An oil seal comprising an annular housing, a radially extending packing in said housing for encompassing relation to a centrally located shaft and for sealing engagement therewith, an annular metallic ring carried by said housing having an annular radially extending flange and an annular axially extending flange integral with said radially extending flange, and an annular ring of lead secured to the inner periphery of said axially extending flange.

DONALD A. BOYD.